(12) United States Patent
Freeman et al.

(10) Patent No.: US 9,950,647 B2
(45) Date of Patent: Apr. 24, 2018

(54) SEAT FORM FOR AMUSEMENT RIDES

(71) Applicant: Lagoon Corporation, Inc., Farmington, UT (US)

(72) Inventors: Dal Freeman, Farmington, UT (US); Aaron Jarrett, Farmington, UT (US); Dustin Allen, Farmington, UT (US)

(73) Assignee: LAGOON CORPORATION, INC., Farmington, UT (US)

( * ) Notice: Subject to any disclaimer, the term of this patent is extended or adjusted under 35 U.S.C. 154(b) by 136 days.

(21) Appl. No.: 14/690,334

(22) Filed: Apr. 17, 2015

(65) Prior Publication Data

US 2016/0304002 A1    Oct. 20, 2016

(51) Int. Cl.
| | |
|---|---|
| *B60N 2/24* | (2006.01) |
| *A63G 7/00* | (2006.01) |
| *B60R 21/02* | (2006.01) |
| *A63G 31/02* | (2006.01) |

(52) U.S. Cl.
CPC ............ *B60N 2/24* (2013.01); *A63G 7/00* (2013.01); *A63G 31/02* (2013.01); *B60R 21/02* (2013.01)

(58) Field of Classification Search
CPC ... A63G 1/28; A63G 1/34; A63G 7/00; A63G 31/06; A63G 31/08; B60N 2/42; B60R 2021/0206
See application file for complete search history.

(56) References Cited

U.S. PATENT DOCUMENTS

| | | |
|---|---|---|
| 69,430 A | 10/1867 | Heesen |
| 821,388 A | 5/1906 | Unger |
| 1,499,166 A | 6/1924 | Fraizer |
| 1,735,921 A | 11/1929 | Franzosa |
| 2,165,698 A | 7/1939 | Eyerly |

(Continued)

FOREIGN PATENT DOCUMENTS

| | | |
|---|---|---|
| CN | 1468130 A | 1/2004 |
| CN | 100584418 C | 1/2010 |

(Continued)

OTHER PUBLICATIONS

European Search Report for European Patent Application No. 16161432.6 dated Sep. 16, 2016, 7 pages.

(Continued)

*Primary Examiner* — Timothy J Brindley
(74) *Attorney, Agent, or Firm* — Thorpe North & Western, LLP

(57) ABSTRACT

A contoured seat form includes a lower support surface on which a user's legs and buttocks are supported, the lower support surface including a forward edge having: i) a pair of primary leg support surfaces extending inwardly from side edges of the forward edge; and ii) a pair of indent surfaces, each extending backwardly from the leg support surfaces. At least one leg indentation is formed into which a smaller rider's leg or legs can fit. A back support surface by which a rider's back is supported includes a pair of contoured protrusions that extend forwardly therefrom, the pair of contoured protrusions defining a torso indentation therebetween, the torso indentation being sized such that a smaller rider's torso will fit between the pair of protrusions while a larger rider's torso will be prevented from entering the torso indentation by the contoured protrusions.

9 Claims, 4 Drawing Sheets

(56) References Cited

U.S. PATENT DOCUMENTS

| | | | | |
|---|---|---|---|---|
| 2,380,102 A * | 7/1945 | Farmer | ............... | A61G 7/02 |
| | | | | 297/452.22 |
| D173,828 S | 1/1955 | Ziebell | | |
| 2,970,638 A * | 2/1961 | Halter | ............... | A47C 3/12 |
| | | | | 248/628 |
| 3,287,064 A | 11/1966 | Freeman | | |
| 3,393,010 A | 7/1968 | Steinberg | | |
| 3,713,696 A * | 1/1973 | Dudley | ............... | B60N 2/64 |
| | | | | 297/452.26 |
| 3,845,892 A | 11/1974 | Bernhardt, Jr. | | |
| 3,881,744 A | 5/1975 | Tupper | | |
| 3,888,329 A | 6/1975 | Monaghan | | |
| 3,890,004 A * | 6/1975 | Rail | ............... | A47C 3/16 |
| | | | | 297/423.1 |
| 4,039,225 A | 8/1977 | Tomforde | | |
| 4,054,319 A | 10/1977 | Fogg, Jr. et al. | | |
| 4,082,350 A | 4/1978 | Tomforde | | |
| 4,119,164 A | 10/1978 | Fogg, Jr. et al. | | |
| 4,161,337 A | 7/1979 | Ross et al. | | |
| 4,295,683 A * | 10/1981 | Dubbink | ............... | A47K 3/127 |
| | | | | 297/377 |
| 4,300,249 A * | 11/1981 | Taylor | ............... | A61G 5/00 |
| | | | | 297/423.17 |
| 4,580,842 A | 4/1986 | Segal | | |
| 4,653,809 A | 3/1987 | Czernakowski et al. | | |
| 4,765,685 A | 8/1988 | Sudoh et al. | | |
| D301,091 S | 5/1989 | Kimball | | |
| 4,913,498 A | 4/1990 | Forlivio | | |
| 4,960,304 A * | 10/1990 | Frantz | ............... | A47C 7/021 |
| | | | | 297/284.6 |
| D321,613 S | 11/1991 | Gandy | | |
| 5,076,643 A | 12/1991 | Colasanti et al. | | |
| 5,100,199 A | 3/1992 | Vander Stel et al. | | |
| 5,238,265 A | 8/1993 | Duce | | |
| 5,248,182 A * | 9/1993 | Hittie | ............... | A47C 7/425 |
| | | | | 297/230.1 |
| 5,275,464 A | 1/1994 | Eichhom et al. | | |
| 5,529,382 A | 6/1996 | Burkat | | |
| 5,722,725 A * | 3/1998 | McNaughton | ............... | A47C 7/425 |
| | | | | 297/284.3 |
| 6,079,783 A | 6/2000 | Schuster, Sr. et al. | | |
| 6,079,785 A | 6/2000 | Peterson et al. | | |
| 6,287,211 B1 | 9/2001 | Bolliger et al. | | |
| 6,315,363 B1 | 11/2001 | Frear | | |
| 6,513,441 B1 | 2/2003 | Clerx et al. | | |
| 6,626,492 B1 | 9/2003 | Uno | | |
| 6,637,341 B2 | 10/2003 | Kroon et al. | | |
| 7,204,559 B2 | 4/2007 | Berra | | |
| 7,261,381 B2 | 8/2007 | Tsai | | |
| 7,393,054 B2 | 7/2008 | McQueen et al. | | |
| 7,677,671 B2 | 3/2010 | Steininger et al. | | |
| 7,770,522 B2 | 8/2010 | Muller et al. | | |
| 8,132,514 B2 | 3/2012 | Lubman et al. | | |
| 8,261,386 B2 * | 9/2012 | Kardos | ............... | A47C 7/425 |
| | | | | 297/452.32 |
| 8,740,303 B2 * | 6/2014 | Halliday | ............... | A47C 31/126 |
| | | | | 297/284.1 |
| 8,845,025 B2 | 9/2014 | Kurata et al. | | |
| 9,332,850 B2 * | 5/2016 | Krishtul | ............... | A47C 7/022 |
| D775,862 S * | 1/2017 | Chen | ............... | D6/601 |
| 2002/0070599 A1* | 6/2002 | Berra | ............... | B60R 21/02 |
| | | | | 297/466 |
| 2004/0012239 A1* | 1/2004 | Lewis | ............... | B60N 2/24 |
| | | | | 297/452.36 |
| 2008/0143158 A1* | 6/2008 | Roodenburg | ............... | A63G 7/00 |
| | | | | 297/284.4 |
| 2008/0179937 A1* | 7/2008 | Steininger | ............... | B60R 21/02 |
| | | | | 297/486 |
| 2011/0018740 A1* | 1/2011 | Boren | ............... | G08B 6/00 |
| | | | | 340/965 |
| 2012/0068507 A1* | 3/2012 | Debevec | ............... | A47C 7/250.1 |
| | | | | 297/250.1 |
| 2012/0119560 A1* | 5/2012 | Wu | ............... | A47C 7/022 |
| | | | | 297/452.21 |
| 2013/0113264 A1* | 5/2013 | Pham | ............... | A47C 7/022 |
| | | | | 297/452.21 |
| 2013/0198961 A1* | 8/2013 | Davis | ............... | A47C 7/62 |
| | | | | 5/648 |
| 2013/0257132 A1* | 10/2013 | Chen | ............... | A47C 7/021 |
| | | | | 297/452.21 |
| 2016/0114750 A1 | 4/2016 | Howard | | |
| 2016/0303482 A1* | 10/2016 | Freeman | ............... | B60R 21/00 |

FOREIGN PATENT DOCUMENTS

| | | |
|---|---|---|
| DE | 69918047 T2 | 7/2005 |
| DE | 202007001485 U1 | 3/2007 |
| FR | 1008155 | 5/1952 |
| GB | 1432592 | 4/1976 |
| GB | 2149313 A | 6/1985 |
| WO | WO 9727904 | 8/1997 |
| WO | WO 98/58718 A1 | 12/1998 |
| WO | WO 9922830 | 5/1999 |

OTHER PUBLICATIONS

Gerstlaurer.; "Dare Devil Dive." Sixflags Over Georgia; Euro-Fighter Style Coaster; Upon knowledge and belief of 2011; http://www.johnnyupsidedown.com/events2012sfg.html; 1 Page.

Gerstlaurer.; "Dare Devil Dive Seats." Sixflags Over Georgia; Euro-Fighter Style Coaster; Upon knowledge and belief of 2011; 1 Page.

Gerstlaurer.; "Dare Devil Dive Seats." Sixflags Over Georgia; Euro-Fighter Style Coaster; Upon knowledge and belief of 2011; Theme Park Review. corn; 1 Page. http://www.themeparkreview.com/forum/viewtopic.php?p=1041806&sid=7ad0991d9839b5faa34695flacf9521b#p1041806.

* cited by examiner

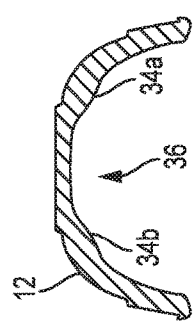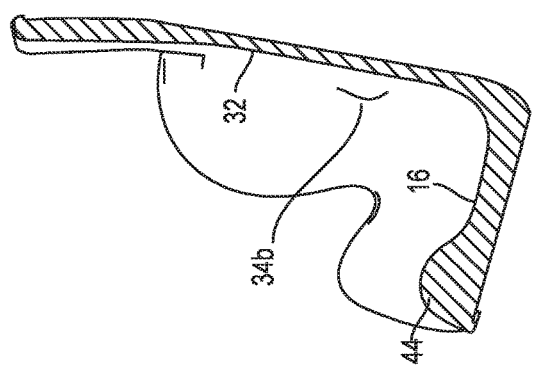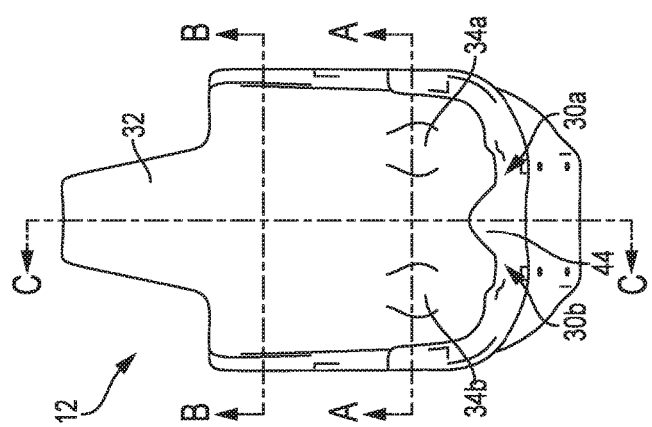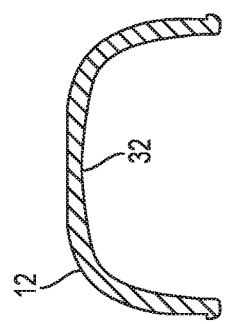

SEAT FORM FOR AMUSEMENT RIDES

BACKGROUND OF THE INVENTION

Field of the Invention

The present invention relates generally to seat forms utilized in amusement rides. More particularly, the invention relates to seat forms optimized to securely receive riders of varying sizes.

Related Art

Amusement rides, such as roller coasters and the like, have been enjoyed by enthusiasts for many years. As technology and consumer appetite for more aggressive rides have progressed, modern amusement rides are highly engineered experiences that subject riders to considerable speeds and forces. Such increases have driven the need for increasingly robust restraint systems that secure riders within a seat. Restraint systems serve two purposes: they prevent riders from accidentally moving from the position in which they are intended to ride, and they prevent careless or reckless riders from intentionally circumventing the safety restraint.

Restraint systems typically include two primary components: a seat belt, lap or chest bar, etc., that engages the rider to restrain the rider in a seat, and the seat itself. As conventional lap bars or belts have been used for some time to secure riders within a particular ride seat, they have been adapted through the years to account for varying ride experiences, ride car designs, etc. For example, lap bars or belts have been provided with some degree of adjustability to account for varying rider size: they can be lowered to a lesser degree for larger people, and lowered to a greater degree for smaller people. Similarly, seat belts can be tightened more for smaller riders and less for larger riders.

SUMMARY OF THE INVENTION

In accordance with one aspect of the invention, a contoured seat form for use in an amusement ride is provided, including a lower support surface on which a user's legs and buttocks can be supported. The lower support surface can include a forward edge having: i) a pair of primary leg support surfaces extending inwardly from side edges of the forward edge; and ii) a pair of indent surfaces, each extending backwardly from the leg support surfaces. The primary leg support surfaces and the indent surfaces can define at least one leg indentation into which a smaller rider's leg or legs can fit. A back support surface can be provided, by which a rider's back is supported. The back support surface can include a pair of contoured protrusions that extend forwardly therefrom, the pair of contoured protrusions can define a torso indentation therebetween, the torso indentation being sized such that a smaller rider's torso will fit between the pair of protrusions while a larger rider's torso will contact peaks of the contoured protrusions.

In accordance with another aspect of the invention, a contoured seat form for use in an amusement ride is provided, including a lower support surface on which a user's legs and buttocks are supported, the lower support surface including a forward edge having a pair of leg indentations formed therein. A back support surface can also be provided, by which a rider's back is supported, the back support surface including a pair of contoured protrusions that extend forwardly therefrom, the pair of contoured protrusions defining a torso indentation therebetween. The torso indentation can be sized such that a small rider's torso will fit between the pair of contoured protrusions and the pair of leg indentations can be sized such that each of the small rider's knees will fit within one of the leg indentations.

In accordance with another aspect of the invention, a method of positioning a rider in a contoured amusement ride seat form is provided, including: positioning each of the rider's knees within one of a pair of leg indentations formed in a forward edge of a lower support surface of the contoured amusement ride seat form; and positioning a torso of the rider in a torso indentation formed between a pair of contoured protrusions that extend forwardly from a back support surface of the contoured amusement ride seat form.

In accordance with another aspect of the invention, a contoured seat form for use in an amusement ride is provided, including a lower support surface on which a user's legs and buttocks are supported, the lower support surface including a forward edge having: i) a pair of primary leg support surfaces extending inwardly from side edges of the forward edge; and ii) a pair of indent surfaces, each extending backwardly from the leg support surfaces. The primary leg support surfaces and the indent surfaces can define at least one leg indentation into which a smaller rider's leg or legs can fit. A back support surface can support a rider's back and a rider restraint can be coupled to the amusement ride, the rider restraint operable to restrain a rider positioned within the seat.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

The following drawings illustrate exemplary embodiments for carrying out the invention. Like reference numerals refer to like parts in different views or embodiments of the present invention in the drawings.

FIG. 4 is a front view of the seat of FIG. 1;

FIG. 4A is a sectional view of the seat of FIG. 4, shown through section A-A of FIG. 4;

FIG. 4B is a sectional view of the seat of FIG. 4, shown through section B-B of FIG. 4;

FIG. 4C is a sectional view of the seat of FIG. 4, shown through section C-C of FIG. 4;

DETAILED DESCRIPTION

Figure 1:
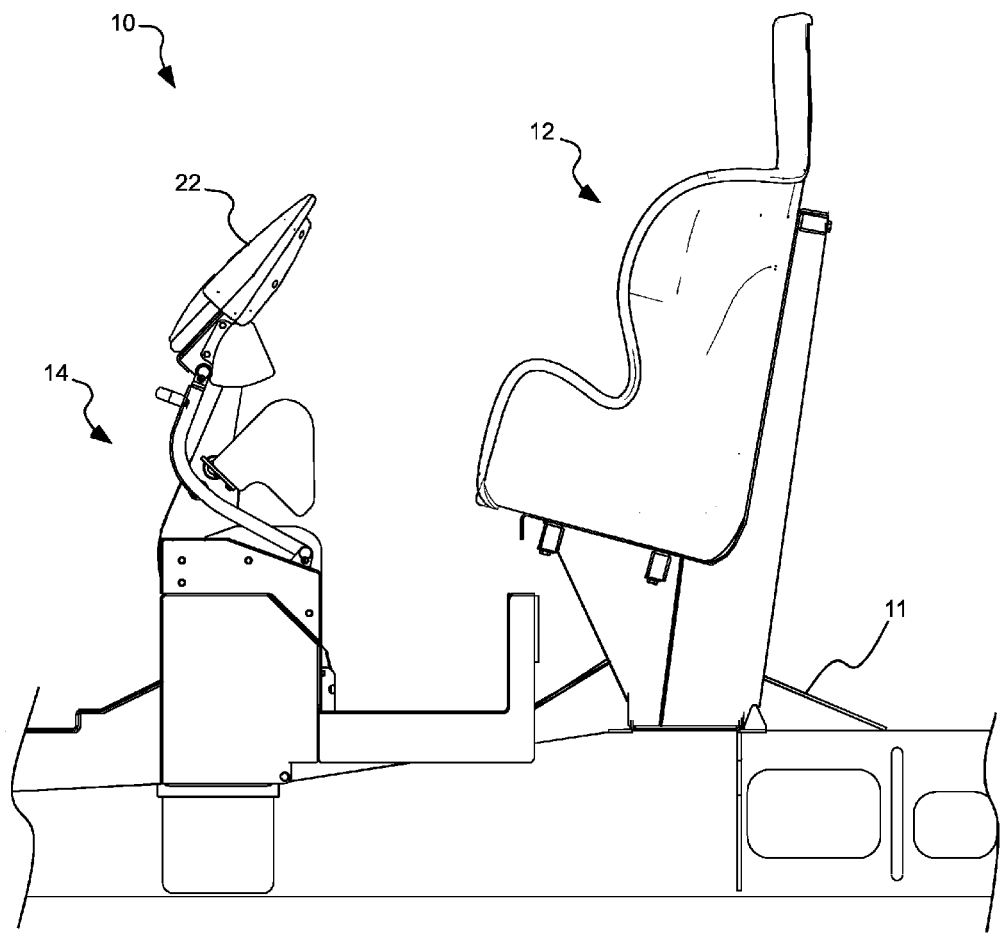
FIG. 1 is a side view of a ride restraint system, including a restraint bar movement assembly and a rider seat in accordance with an embodiment of the invention.
Figure 2:
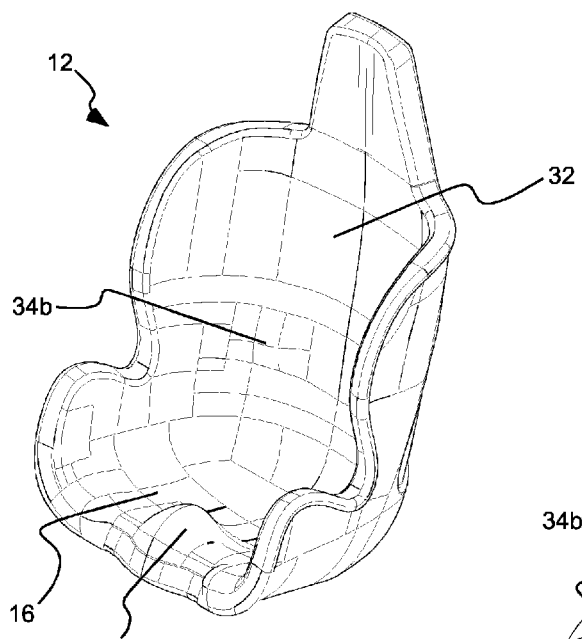
FIG. 2 is a perspective view of the rider seat of FIG. 0.1.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Definitions

As used herein, the singular forms "a" and "the" can include plural referents unless the context clearly dictates otherwise. Thus, for example, reference to "an indentation" can include one or more of such indentations.

As used herein, the term "substantially" refers to the complete or nearly complete extent or degree of an action, characteristic, property, state, structure, item, or result. As an arbitrary example, an object that is "substantially" enclosed is an article that is either completely enclosed or nearly completely enclosed. The exact allowable degree of deviation from absolute completeness may in some cases depend upon the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. As another arbitrary example, a composition that is "substantially free of" an ingredient or element may still actually contain such item so long as there is no measurable effect as a result thereof.

As used herein, the term "about" is used to provide flexibility to a numerical range endpoint by providing that a given value may be "a little above" or "a little below" the endpoint.

Relative directional terms may sometimes be used herein to describe and claim various components of the ride systems of the present invention. Such terms can include, without limitation, "upward," "downward," "horizontal," "vertical," etc. These terms are generally not intended to be limiting, but are used to most clearly describe and claim the various features of the invention. Where such terms must carry some limitation, they are intended to be limited to usage commonly known and understood by those of ordinary skill in the art.

For example, the terms "horizontal" and "vertical" can be used herein to refer to relative orientations of amusement ride components. One of ordinary skill in the art will appreciate that the rider seats of the present invention may experience a wide range of orientations during operation of an amusement ride. The terms "horizontal" and "vertical" are intended to describe orientations of various features relative to a resting position of the ride, typically on a nominally flat rail. Such an orientation is generally used when loading and unloading passengers or riders from the ride cars, for example.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Invention

The present technology relates generally to seat forms for use in rail car rides. While the present technology can be utilized in a variety of applications, including general transit systems, aircraft and the like, the present inventors have found it particularly well adapted for use in amusement rides. While the invention is expressly not limited to such embodiments, for the sake of simplicity the discussion below will focus on use of the rider seats in amusement rides.

Most modern amusement rides include aggressive seat restraints that are rigid bars or pads that move into position over the thighs of riders (and sometimes into the abdomen or chest of riders). With an ideally sized rider, the seat restraints comfortably fit on the rider's lap, with the rider's legs comfortably bent and hanging over a front edge of the seat. In this position, the front edge of the seat is positioned in the bend of the rider's knees and the rider's lower back is pushed snugly against the rear of the seat form.

However, in the case of very small riders, if the rider's back is pushed against the rear of the seat, the rider's legs cannot properly bend, as the knee is positioned rearwardly from the front edge of the seat. The smaller rider's legs essentially protrude outwardly from the seat in an awkward, only slightly bent configuration. This can interfere with proper engagement of the rider by the seat restraint system. If the small rider attempts to compensate for this, by moving forward so that his or her knees bend properly, his or her back and bottom will not be properly supported against the rear of the seat form. This is also undesirable in that the rider may be more likely to move in the seat, and may not be securely held by the overall restraint system.

The present invention addresses these issues by providing a seat form that can accommodate riders of differing sizes. As shown at 10 in FIG. 1, in one aspect of the invention, a contoured seat form 12 is provided that can be installed within an amusement ride car 11. A restraint bar movement assembly 14 can also be coupled to or carried by the ride car. A lap pad 22 is coupled to the restraint bar movement assembly and can be rotated into position over a rider oriented in the seat 12, to secure the rider within the seat.

Only a portion of the ride car is shown at 11. The ride car can take a variety of forms, but is generally adapted to be propelled on a rail, track or similar structure. The manner by which the rail car is propelled, and the type of system with which the rail car is used, will not be described in detail herein. One of ordinary skill in the art, having possession of this disclosure, will readily understand the workings of such systems. The ride car 11 can either be a stand-alone unit which is itself attached to some carrier that rides on a rail system, or the rail car can form an integral part of the rail system. Generally speaking, however, the seat 12 and the restraint bar movement assembly 14 are fixed to the ride car structure, and are fixed in position relative to one another. In some embodiments, the seat and the restraint bar movement assembly are independently coupled or attached to the rail car.

Similarly, operation of the restraint bar movement assembly 14, and the lap pad 22, will not be discussed in detail herein. However, one of ordinary skill in the art, having possession of this disclosure, will readily appreciate the operation of such a system and the interactions of the system with the seat form 12.

Figure 3:
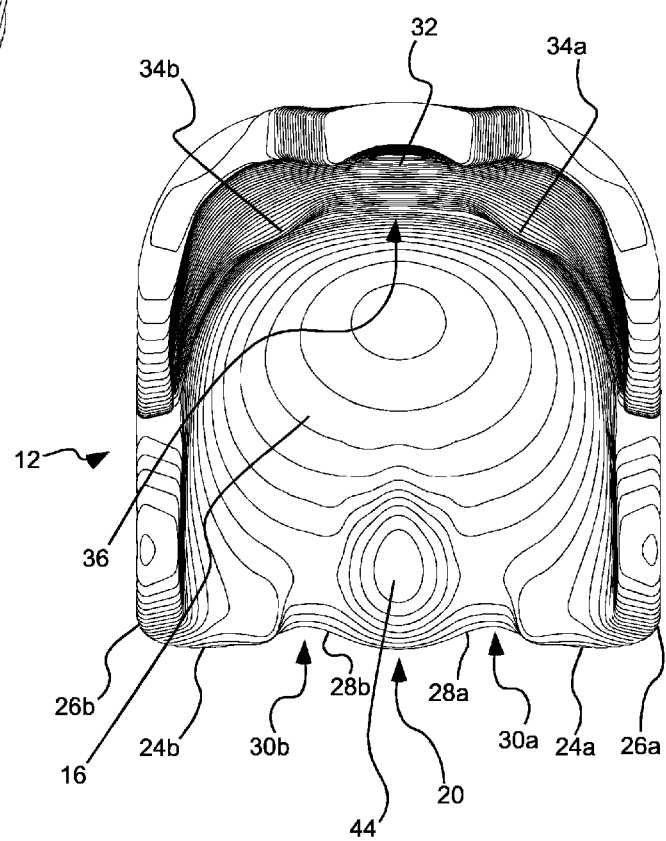
FIG. 3 is top, contoured view of the rider seat of FIG. 1.

The seat form 12 is shown in more detail in FIGS. 2-4C. The seat form can generally include a lower support surface 16 on which a user's legs and buttocks are supported. As best seen in FIG. 3, the lower support surface can include a forward edge 20 that includes a pair of primary leg support surfaces 24a, 24b that extend inwardly from side edges 26a, 26b of the forward edge. A pair of indent surfaces, 28a, 28b, can each extend backwardly (e.g., toward a rear of the seat form) from the primary leg support surfaces. In this manner, the primary leg support surfaces and the indent surfaces define at least one leg indentation 30a, 30b into which a smaller rider's leg or legs can fit.

In the example shown, two leg indentations are defined in the forward edge 20 of the lower support surface 16. In this manner, a dedicated space is provided for each leg of the rider. In some embodiments, however, only a single dedicated space is provided, into which both of the rider's legs can fit side-by-side. While the figures illustrate the two indentations 30a, 30b having a particular size and position, it is to be understood that the size of the indentations can vary: they can be more pronounced or less pronounced than those shown, to accommodate differing designs adapted for smaller riders. The indentations allow a smaller rider's legs to bend about a forward edge of the seat form at a location closer to a back of the seat form than would be the case with a larger rider's legs.

The seat form 12 can also include a back support surface 32 by which a rider's back can be supported. In one aspect of the invention, the back support surface can include a pair of contoured protrusions 34a, 34b that extend forwardly therefrom. The pair of contoured protrusions can define a torso indentation 36 therebetween. The torso indentation can be sized such that a smaller rider's torso (shown by example at 40 in FIG. 5A) will fit between the pair of protrusions while a larger rider's torso (shown by example at 42 in FIG. 5B) will not be significantly affected by the contoured protrusions. Generally, the larger rider's torso will contact forward (or peak) surfaces of the pair of protrusions, without the rider experiencing a significant difference between the present seat form and conventional seat forms.

As those terms are used herein, a "larger rider" is one of normal, or above normal stature, such as a typical adult. A "smaller rider" can be a child, or an elderly person, whose smaller stature would not normally be accommodated by conventional seats. Such smaller riders would conventionally be required to fit very awkwardly within the seat, and would not normally be well supported by conventional seat forms.

The seat form 12 thus provides two mechanisms by which a smaller rider's smaller features can be securely accommodated, while the seat form also securely accommodates larger riders. As will be appreciated by the view in FIG. 5B, a normal-sized rider 42 can be positioned in, and supported by, the seat form 12 in much the same manner as conventional seat forms. The rider 42 can comfortably rest his or her back against upper portions of the back support surface 32 while his or her legs comfortably bend about the forward edge 20 of the lower support surface 16. As the larger rider's torso is sufficiently large, it does not fully fit within the torso indention 36 of FIG. 5A, but is rather supported by the generally flat upper portion of the back support surface 32 and by peaks of the protrusions. While some portions of the larger rider's torso may bend into, or otherwise be pressed into, the torso indentation, the larger rider's torso is also supported laterally outside the protrusions, and by peaks of the protrusions. Thus, the seat form performs well for riders of this size.

Figure 5A:
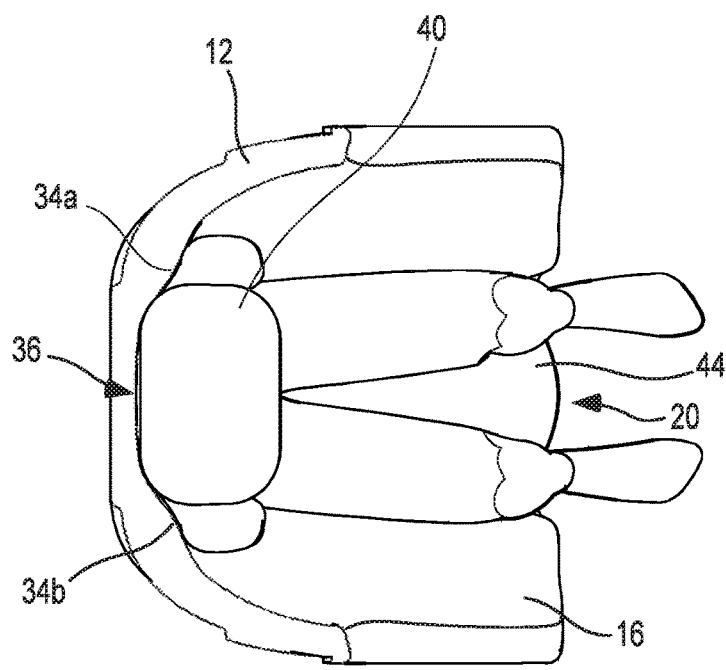
FIG. 5A is a top view of the rider seat of FIG. 1, shown with a section of a smaller rider's body positioned therein.
Figure 5B:
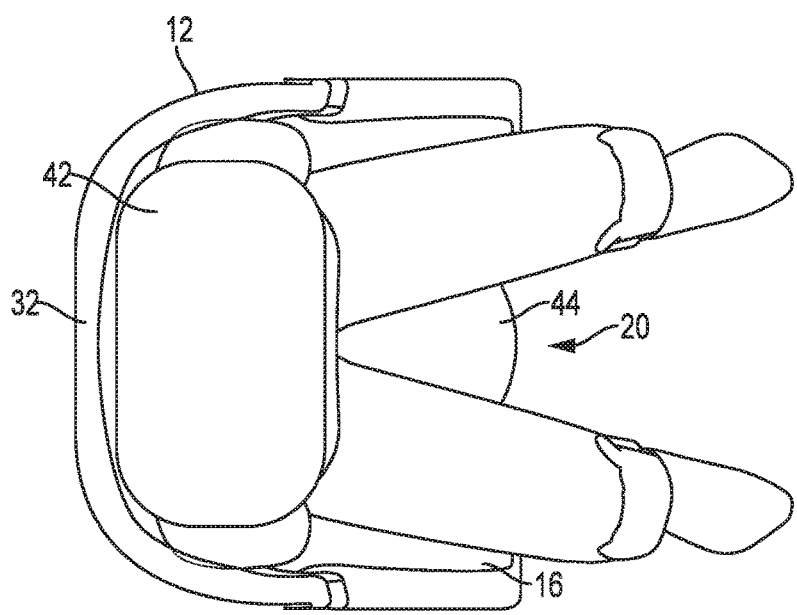
FIG. 5B is a top view of the rider seat of FIG. 1, shown with a section of a larger rider's body positioned therein.

Advantageously, as shown in FIG. 5A, the torso indentation 36 and the leg indentations (30a and 30b of FIG. 3) can also provide a manner by which smaller-sized riders can also be securely accommodated by the seat form. When a smaller rider 40 is seated within the seat form 12, his or her torso is small enough to fit within the torso indentation 36, and can thus comfortably rest his or her back against the generally flat surface of this indentation. In addition, his or her knees can be moved back into the leg indentations and can comfortably bend about the indent surfaces 28a, 28b of these indentations.

Thus, with little or no additional resources required on behalf of the ride operator, a larger—42 or smaller-sized rider 40 can be quickly and securely positioned in the seat form in a manner that best supports his or her stature. The present inventors have found that the torso indentation 36 and the leg indentations 30a, 30b, while providing a much better interface for smaller riders, are only minimally, if at all, noticeable by larger or normal-sized riders.

The leg indentations 30a, 30b can be formed in a variety of manners. As discussed above, in one aspect, primary leg support surfaces 24a, 24b, can extend inwardly toward a center of the forward edge 20 of the seat 12 in a direction that is substantially orthogonal to side edges 26a, 26b of the lower support surface 16. The pair of indent surfaces, 28a, 28b, can each extend backwardly (e.g., toward a rear of the seat form) from the primary leg support surfaces. In addition, a middle horn 44 can extend forwardly from each of the indent surfaces to create two distinct leg indentations 30a, 30b, one for each leg of the rider. The middle horn can include a generally curved contour, so that the transition from the leg indentations is gradual and not uncomfortable for a rider.

The middle horn 44 can also extend upwardly from the lower support surface 16 to create a raised portion that separates the rider's legs. This upward projection can be appreciated from the views of FIGS. 2, 3, 4, 4C, etc. The middle horn can thus aid in maintaining riders of all sizes within the seat form 12, as the combination of the lap pad (22 in FIG. 1) and the middle horn create a barrier that prevents riders from possibly crossing their legs and potentially twisting within the seat. The combination of the two can thereby prevent smaller riders from intentionally or inadvertently sliding out from beneath the restraint system.

As shown best in FIG. 4C, the back support surface 32 is substantially flat in areas other than where the protrusions 34a, 34b extend from the back support surface. As the term "flat" is used herein, it refers to a relative surface contour that one of ordinary skill in the art would appreciate as presenting to the rider the feel of continuous support. For most purposes, the seat form presents a flat surface to riders, with the exception of the middle horn 44 and the protrusions 34a, 34b. This otherwise flat surface presents to all riders a comfortable ride experience that is consistent with the "feel" of conventional seat supports. The back support surface is thus substantially flat above the protrusions and between the protrusions, as shown in FIG. 4C. The back support surface can be substantially flat all along a vertical centerline of the back support surface.

The size and shape of the torso indentation can vary. In the aspects shown, the protrusions 34a, 34b are generally smoothly curved contours that extend from the back support surface 32. The protrusions can extend outwardly a total of about 0.5 inches to about 2.0 inches, measured from the back support surface (see FIG. 4C for example), and can define between them the torso indentation that can be about 5.0 to about 10.0 inches in width. The middle horn can similarly exhibit a smooth, natural contour and can extend upwardly between about 2.0 inches and about 3.0 inches, measured from the lower support surface 16 (see FIG. 4C, for example).

In addition to the structural components discussed above, the present invention also provides a method of positioning a rider in a contoured amusement ride seat form. The method can include positioning each of the rider's knees within one of a pair of leg indentations formed in a forward edge of a lower support surface of the contoured amusement ride seat form. A torso of the rider can be positioned in a torso indentation formed between a pair of contoured protrusions that extend forwardly from a back support surface of the contoured amusement ride seat form.

In this method, the lower support surface of the contoured amusement ride seat form can include a middle horn extending forwardly between each of the pair of leg indentations, and the method can further include positioning the rider's knees on opposing sides of the middle horn. The middle horn can also extend upwardly from the lower support surface to create a raised portion that separates the rider's legs. Positioning the torso of the rider can include positioning the rider's torso against a flat portion between the pair of contoured protrusions. The seat form can be installed within an amusement ride, and the method can further include restraining the rider within the seat form.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the examples.

We claim:

1. A contoured seat form for use in an amusement ride, comprising
a lower support surface on which a user's legs and buttocks are supported, the lower support surface including a forward surface having: i) a pair of primary leg support surfaces extending inwardly from side edges of the forward surface; and ii) a pair of indent surfaces, each extending backwardly from the leg support surfaces;
the primary leg support surfaces and the indent surfaces defining at least one leg indentation into which a smaller rider's leg or legs can fit while a larger rider's legs may be restrained by the primary leg support surfaces; and
a back support surface by which a rider's back is supported;
the back support surface including a pair of contoured protrusions that extend forwardly therefrom, the pair of contoured protrusions defining a torso indentation therebetween, the torso indentation including a substantially flat portion having a width of between about five inches and about ten inches to allow a smaller rider's torso to lie flat against the substantially flat portion while a larger rider's torso may contact peaks of the contoured protrusions.

2. The seat form of claim 1, wherein the primary leg support surfaces extend toward a center of the forward surface of the seat substantially orthogonally from side edges of the lower support surface.

3. The seat form of claim 1, further comprising a middle horn extending forwardly from each of the indent surfaces to create two distinct leg indentations, one for each leg of the rider.

4. The seat form of claim 3, wherein the middle horn also extends upwardly from the lower support surface to create a raised portion that separates the rider's legs.

5. The seat form of claim 1, wherein the back support surface is substantially flat above the pair of contoured protrusions.

6. The seat form of claim 1, wherein the contoured protrusions extend forwardly from the back support surface by between at least about 0.5 inches and about 2.0 inches.

7. The seat form of claim 1, wherein the seat form is installed within an amusement ride, and further comprising a rider restraint coupled to the amusement ride, the rider restraint operable to restrain a rider positioned within the seat.

8. A contoured seat form for use in an amusement ride, comprising:
a lower support surface on which a user's legs and buttocks are supported, the lower support surface including a forward surface having: i) a pair of primary leg support surfaces extending inwardly from side edges of the forward surface; and ii) a pair of indent surfaces, each extending backwardly from the leg support surfaces;
the primary leg support surfaces and the indent surfaces defining at least one leg indentation into which a smaller rider's leg or legs can fit while a larger rider's leg or legs may be restrained by the primary leg support surfaces;
a back support surface by which a rider's back is supported;
the back support surface including a pair of contoured protrusions that extend forwardly therefrom and that define a substantially flat portion therebetween; wherein
the pair of contoured protrusions of the back support surface are aligned with respect to the leg indentations of the lower support surface such that the smaller rider's torso fits against the flat portion of the back support when the smaller rider's legs are received within the leg indentations of the lower support surface; and
a rider restraint coupled to the amusement ride, the rider restraint operable to restrain a rider positioned within the seat.

9. The seat form of claim 8, wherein the seat form and the rider restraint are independently coupled to a ride car of the amusement ride.

* * * * *